United States Patent [19]

Pitt, III et al.

[11] Patent Number: 5,675,520
[45] Date of Patent: Oct. 7, 1997

[54] METHOD FOR EXTENDING A COMMON USER INTERFACE

[75] Inventors: George H. Pitt, III, Redmond; Christopher J. Guzak, Kirkland, both of Wash.

[73] Assignee: Microsoft Corporation, Redmond, Wash.

[21] Appl. No.: 413,341

[22] Filed: Mar. 30, 1995

[51] Int. Cl.$^6$ .................................................. G06F 3/14
[52] U.S. Cl. .......................... 364/578; 395/333; 395/975
[58] Field of Search ........................ 364/578; 395/975, 395/331–339, 341–349, 326

[56] References Cited

U.S. PATENT DOCUMENTS

| | | | |
|---|---|---|---|
| 5,438,659 | 8/1995 | Notess et al. | 395/155 |
| 5,555,370 | 9/1996 | Li et al. | 395/161 |

OTHER PUBLICATIONS

"Menus and Dialogs", Chapter 4, *Programmer's Guide, Microsoft Visual Basic, Programming System for Windows*, Version 3.0, pp. 93–110.

*Language Reference, Microsoft Visual Basic, Programming System for Windows*, Version 3.0, pp. 88–90, 217–219.

"The Microsoft Visual Basic Workshop" John Clark Craig, Microsoft Press, pp. 120–125 (1991).

*Primary Examiner*—Kevin J. Teska
*Assistant Examiner*—A. S. Roberts
*Attorney, Agent, or Firm*—Klarquist Sparkman Campbell Leigh & Whinston, LLP

[57] ABSTRACT

A method for extending a common user interface in a windowing environment of a programmed computer system. To customize a common dialog box, an application provides a sub-dialog box template defining application-specific extensions to the common dialog box, and a sub-dialog procedure for controlling the behavior of the application-specific extensions. An operating system processes input to the extended version of the common dialog box depending on where user input occurs. In response to input at application-specific controls, the system sends a message to the sub-dialog procedure. In response to input at standard controls, the system sends a message to a common dialog procedure provided in the operating system.

14 Claims, 5 Drawing Sheets

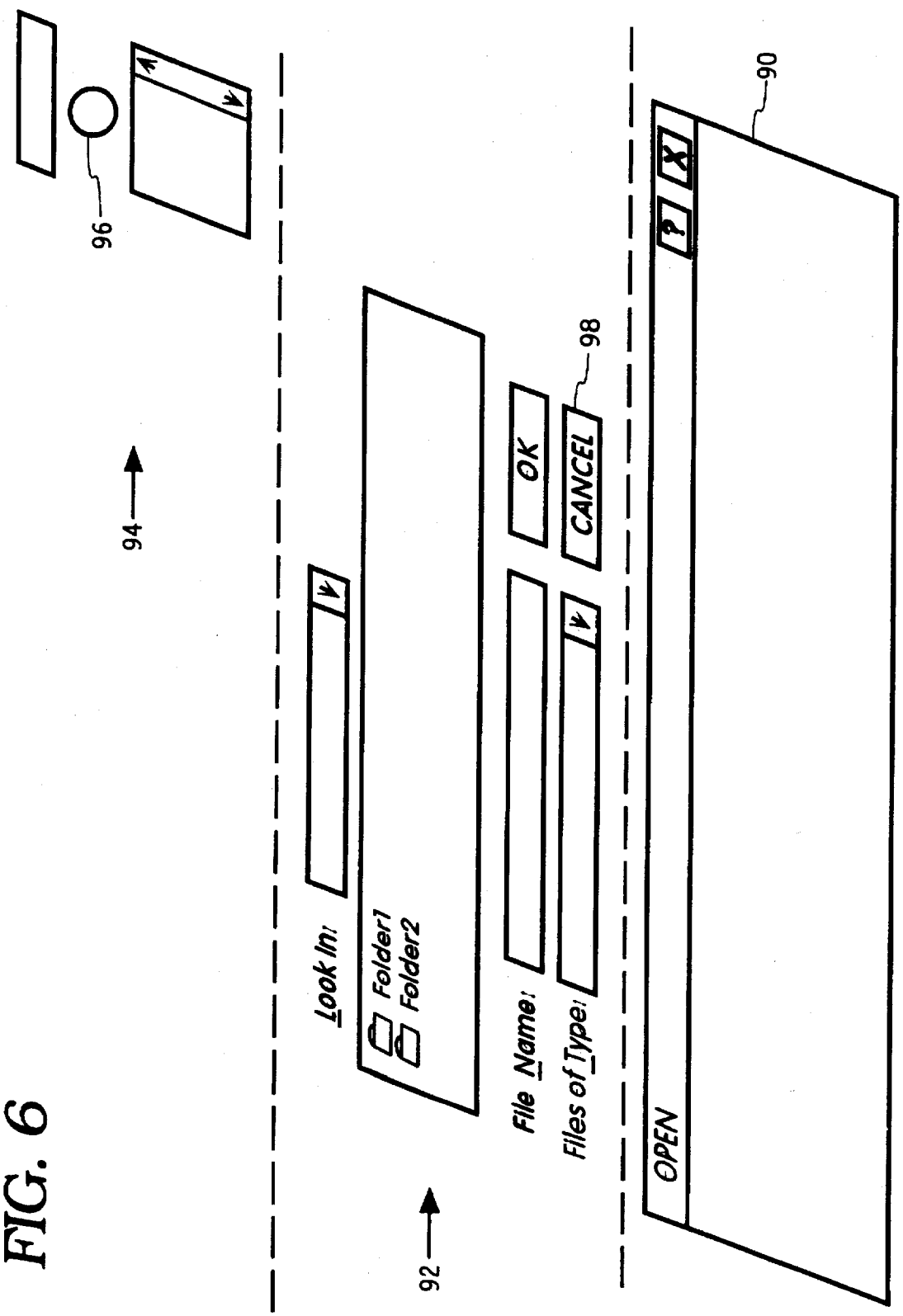

METHOD FOR EXTENDING A COMMON USER INTERFACE

FIELD OF THE INVENTION

The invention relates to a user interface for a computer system, and more specifically relates to a common user interface provided in an operating system for use by application programs.

BACKGROUND

Computer programs such as an operating system shell or an application program typically provide a graphical user interface to allow a user to enter data and view output on a display screen. In the windowing environments popular today, programs present the user with a graphical user interface having specially delineated areas of the screen called windows. Each window can act independently as if it were a virtual display device. A window typically has its own boundaries, can include its own menu or controls, and may be moved around the screen, resized and overlapped with another window. Examples of windowing environments today include Microsoft Windows, the OS/2 Presentation manager from IBM, and Apple Computer's Macintosh Finder.

One example of a window is a dialog box. A dialog box is a temporary window presented to the user to retrieve input. To prompt a user for information, a dialog box typically includes a number of controls in which the user enters text, chooses options, or directs the action of a command.

Some windowing environments such as Microsoft Windows make the application developer's job easier by providing software tools to create a graphical user interface. For example, application developers usually wish to include dialog boxes as part of the user interface to an application program (application). For dialog boxes that are often used in a variety of applications, the system such as the operating system or the software that supports the windowing environment can provide a common dialog box for use by applications. The common dialog box simplifies application development because the application no longer needs to specify the look and behavior of the dialog box.

While common user interface support is very helpful in simplifying application development, an application developer often wants to extend the common user interface features to include features specific to an application. For example, an application developer may wish to customize a common dialog by increasing its size and adding new controls. To enable the application developer to extend the common dialog box, the application must be able to change the appearance of the common dialog and must be able to interact with the common dialog to alter its behavior. Allowing the developer to customize a common user interface feature is important because it enables the developer to build on existing resources.

Unfortunately, existing methods used to customize user interface features make upgrades to the underlying system software more difficult. If current customization techniques are used, the system software cannot be changed significantly without adversely affecting customized user interface features in existing software. For instance, if an upgrade in the system software causes changes in the features of a common dialog box, then applications including extensions to the common dialog box may no longer work properly. This problem results from inter-dependence of the application-specific extensions and the underlying common interface software.

The method for extending a common dialog box in Microsoft Windows is an example of the problem outlined above. A Windows 3.1 system includes a shared library for supporting common dialog boxes. This library includes dialog box procedures for controlling the behavior of common dialog boxes, and dialog box templates for specifying the appearance of the common dialog boxes. The dialog box procedure is a callback function that the system calls when it has input for the common dialog box or tasks for the dialog box to carry out. The dialog box template is a description of the appearance of the common dialog box including the controls it contains. If a developer wishes to incorporate a common dialog box into an application, the application simply has to call a single function in the common dialog box library rather than supplying a dialog box procedure and associated template.

To extend a common dialog in Microsoft's Windows 3.1, the application developer supplies a dialog template and a hook procedure. In order to modify the appearance of the dialog box, the dialog template specifies how the entire dialog box appears, not just the application-specific modifications. The hook procedure is a procedure in the application used to access messages sent to the common dialog box. This hook procedure receives every message sent to the dialog box before the common dialog procedure, whether the application needs the information or not.

When this technique is used to extend a common dialog box, the extensions to the common dialog become dependent on specific features and behavior of the common dialog box. To extend the common dialog box, the application developer includes everything about the appearance of the common dialog box in the template. In addition, the hook procedure receives all messages for the common dialog box even if they relate only to functions to be carried out using the common dialog box procedure. This technique inhibits upgrades to the common dialog box software because modifications to the common dialog box can make the application-specific extensions to the old common dialog box incompatible with the new version of the common dialog box.

Because of the problems outlined above, there is a need to develop a method for extending a common user interface that minimizes the impact of revisions on the common user interface to application-specific extensions of that interface.

SUMMARY OF THE INVENTION

To address the drawbacks of the prior art, the invention provides an improved method to extend a common user interface. According to one embodiment of the invention, the method involves extending a common dialog box provided by an operating system that supports a windowing environment. The operating system includes a shared common dialog box library accessible to applications running in a computer system. The common dialog box library has a number of common dialog boxes that applications can use by making a function call to the common dialog box library.

According to this embodiment, applications can extend a common dialog box by specifying a sub-dialog box template and a sub-dialog box procedure when making a call to the common dialog box library. In response, the system creates a common dialog box and then creates a sub-dialog box according to the description included in the sub-dialog box template. The system then displays the standard controls and the application-specific extensions to the common dialog box in the extended version of the common dialog box.

In processing user input to the extended version of the common dialog box, the system sends messages to the immediate parent of the control where user input occurs. User input that occurs in an application-specific extension to the common dialog box is sent directly to the sub-dialog box procedure. User input that occurs in a standard control of the common dialog box is sent directly to a common dialog box procedure. By separating application-specific extensions in a sub-dialog box, the extensions to the common dialog box can process user input independent from the common dialog box.

This method for extending a common dialog box provides several advantages over existing methods. Using this method, the common dialog box can be easily modified while still maintaining compatibility with applications that extend the common dialog box. Compatibility is maintained because the extensions to the common user interface provided by the system are not dependent on the behavior of the common dialog box, In addition to improving the flexibility in the underlying user interface support in the operating system, this method makes the application developer's job much easier. The application developer does not need to know how the common dialog box behaves. Rather, the developer only has to design his or her extensions to the common dialog box and provide a sub-dialog box procedure to process only application-specific extensions. That is, the application developer only has to create a sub-dialog template that modifies the existing common dialog box template. The sub-dialog box template only has to include the application-specific extensions. By requiring only a simple sub-dialog template and procedure, customizing a common user interface is significantly easier.

Further advantages and features of the invention will become apparent to those skilled in the art from the following description and accompanying drawings.

BRIEF DESCRIPTION OF THE DRAWINGS

FIG. 6 illustrates an example of a common dialog box and the application-specific extensions to the common dialog box.

DETAILED DESCRIPTION

Figure 1:
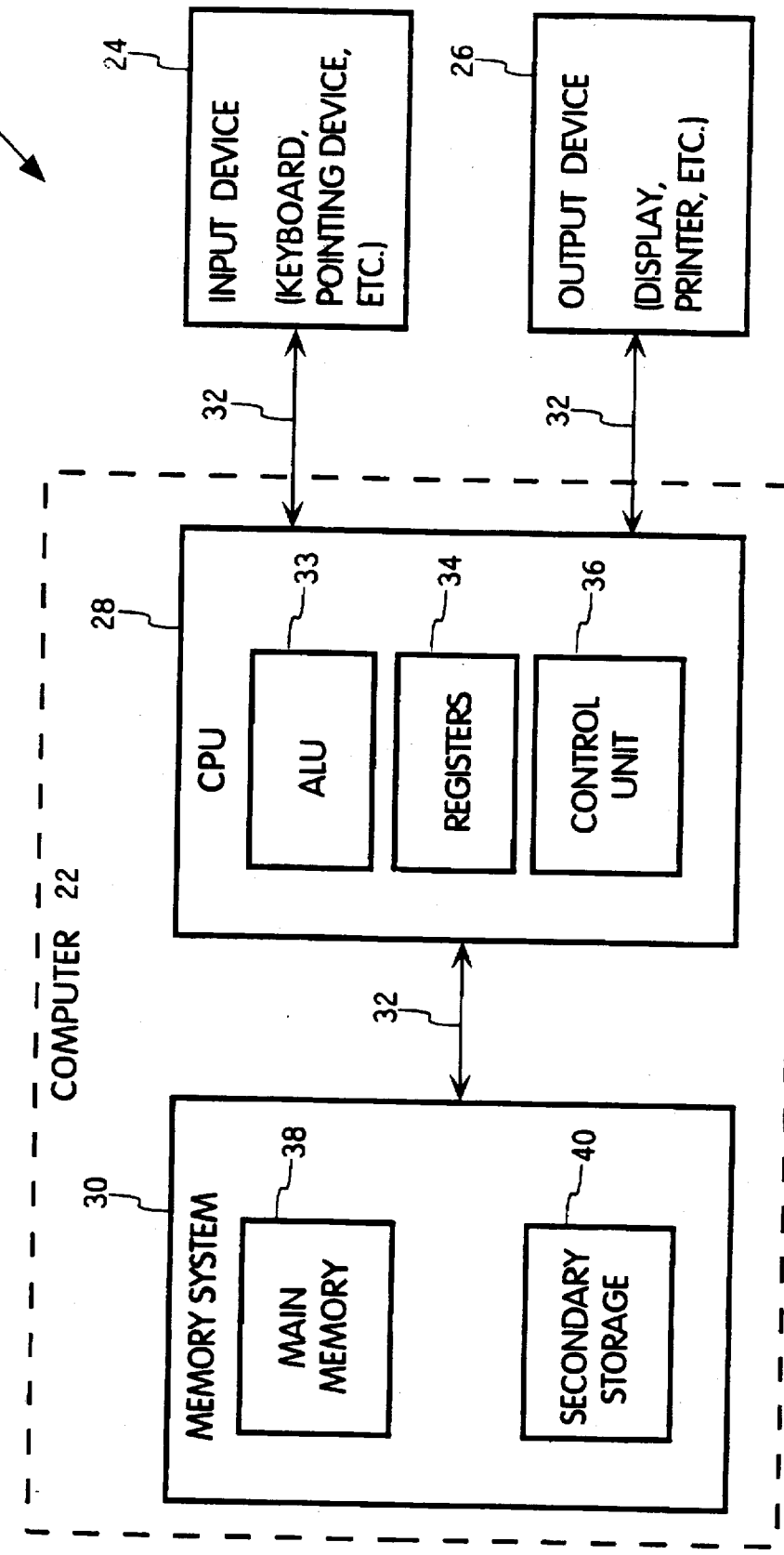
FIG. 1 is a block diagram of a computer system in which a method according to an embodiment of the invention may be implemented.

FIG. 1 is a block diagram of a computer system 20 in which a method according to an embodiment of the invention may be implemented. Computer system 20 includes as its basic elements a computer 22, input device 24 and output device 26.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions, and a control unit 36 for controlling the operation of computer system 20 in response to instructions from a computer program—such as an application or an operating system.

Memory system 30 generally includes high-speed main memory 38 in the form of random access memory (RAM) and read only memory (ROM) semiconductor devices. The system further includes secondary storage 40 in the form of floppy disks, hard disks, tape, CD-ROM, or other devices that use optical, magnetic or other recording material. Main memory 38 stores programs such as a computer's operating system and currently running application programs. Main memory 38 also includes video display memory for displaying images through a display device.

Input device 24 and output device 26 are typically peripheral devices connected by bus structure 32 to computer 22. Input device 24 may be a keyboard, pointing device, pen, or other device for providing input data to the computer. Output device 26 may be a display device, printer, sound device or other device for providing output data from the computer.

It should be understood that FIG. 1 is a block diagram illustrating the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which one or more of these parts of the CPU are integrated together, such as in a microprocessor. Moreover, the number and arrangement of the elements of the computer system may be varied from what is shown and described in ways known in the art (i.e., multiple CPUs, client-server systems, computer networking, etc.).

Figure 2:
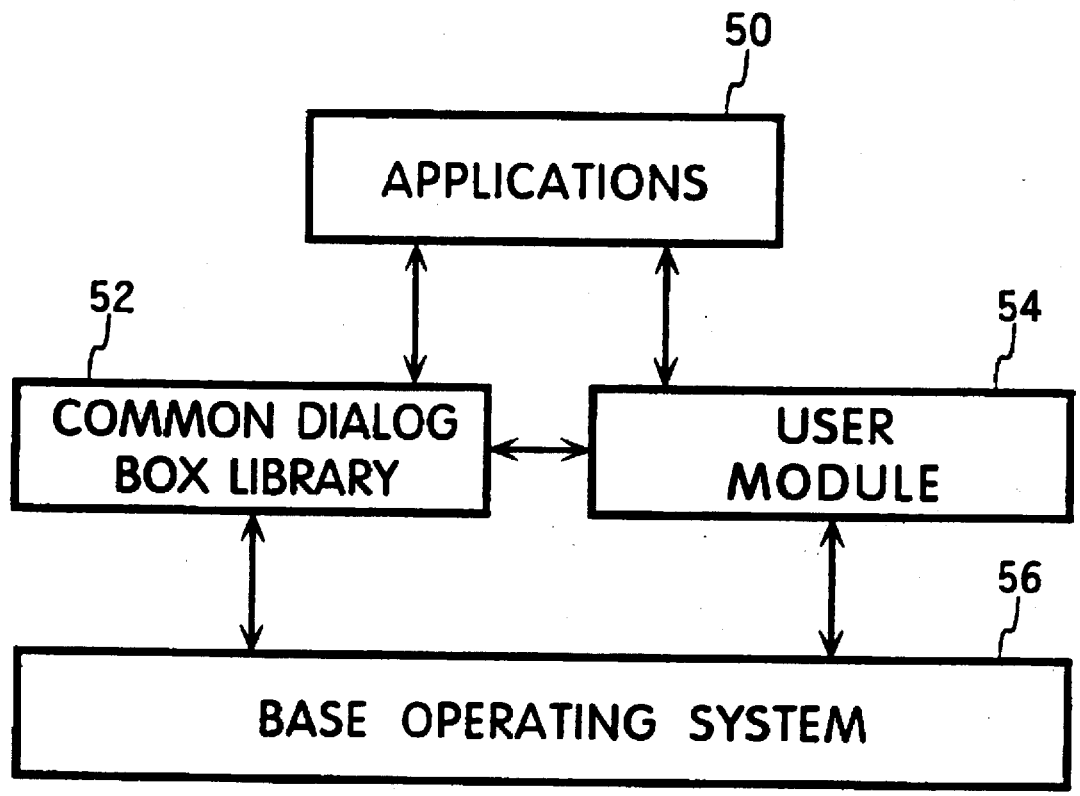
FIG. 2 is a general block diagram illustrating the architecture of a windowing system in which a method according to an embodiment of the invention may be implemented.

FIG. 2 is a general block diagram illustrating the architecture of a windowing system. FIG. 2 shows the relationship among applications 50, a common dialog box library 52, a user module 54, and the base operating system 56. The architecture depicted in FIG. 2 is merely an example of a windowing system in which the invention may be implemented, and particularly illustrates the architecture of the Windows 95 operating system from Microsoft Corporation. The following description includes a discussion of how the windowing environment is implemented in the Windows 95 operating system. It should be understood, however, that a method for extending a common user interface according to the invention can vary depending on the windowing environment in which the invention is implemented.

The common dialog box library 52 includes a number of functions and data structures supporting common dialog boxes. Applications 50 share the common dialogs provided in the common dialog box library 52. The user module is a component of the operating system that performs windows management, including creation and manipulation of windows and message communication among windows.

The base operating system 56 includes a number of components to perform basic operating system functions. The base operating system 56 includes software to implement file management, task scheduling, virtual memory operations, program loading and termination, and intertask communication. The base operating system 56 also includes a number of device drivers providing an interface between the operating system software and a variety of hardware devices such as the keyboard, mouse, and display screen. The device drivers in the Windows 95 operating system are software modules that control all aspects of a device's operation such as moving data to and from memory buffers, handling interrupt requests, and so on. The specific design of the underlying operating system, however, is not critical to the invention. Any of several well-known operating systems can provide these base operating system 56 functions to support a windowing environment.

In the Windows 95 operating system, the user module 54 supports a windowing environment by providing a variety of window management functions. The user module 54 manages the creation and manipulation of on-screen windows, dialog boxes, buttons, and other elements of the windowing environment. The user module 54 also provides window management functions to enable applications 50 to display output, prompt for user input, and carry out the other tasks necessary to support interaction with the user.

Applications 50 receive input from the user module 54 in the form of messages. To convey this input, the user module 54 controls message passing to the appropriate window. Each window has a function called a window procedure that the user module 54 calls whenever it has a input for a window. When a window procedure receives a message, it processes the input and returns control to the operating system.

Messages sent to a window procedure include four parameters: a window handle, a message identifier, and two message parameters. The window handle identifies the window for which the message is intended. A message identifier is a named constant that identifies the purpose of the message. When a window procedure receives a message, it uses a message identifier to determine how to process a message. The window procedure checks the message identifier to determine how to interpret message parameters. Message parameters specify data or the location of data used by a window procedure when processing the message.. The meaning and value of a message parameter depend on the message. A message parameter can include an integer, packed bit flags, a pointer to a structure containing additional data, and so on. For more information on messages, please see, "Chapter 2, Messages and Message Queues," (Appendix A) included in the file wrapper but not printed herein.

The user module 54 implements two methods to route messages to a window procedure: posting messages in a first-in, first-out queue called a message queue, a system defined memory object that temporarily stores messages, and sending messages directly to a window procedure. Messages posted to a message queue, called "queued messages," are primarily the result of user input entered through a mouse or keyboard. Other messages, called "non-queued messages," are sent directly to a window procedure.

Applications 50 receive mouse and keyboard input in the form of messages. In the Windows 95 operating system, the base operating system 56 translates mouse movement, mouse button clicks, and keystrokes into input messages and places them into a system message queue. The operating system removes messages from the message queue and posts the messages in the appropriate queue. For 16 bit applications compatible with Windows 3.1 operating system, the system maintains an application message queue for all 16 bit applications.

For 32 bit applications, however, the operating system maintains a message queue for each thread of an executing program. A thread is part of a process. A program loaded into memory and prepared for execution is a process. The process has its own address space and includes the program's code, data, and other system resources such as files, pipes and synchronization objects. A thread can execute any part of a program's code, including a part executed by another thread. For 32 bit applications, the operating system posts the message in the message queue for the thread that created the destination window.

The application uses message functions implemented in the user module 54 to extract messages from the queue and dispatch them to the appropriate window procedure for processing. An application retrieves a message from its queue using a GetMessage function. After removing a message from its queue, an application can use the DispatchMessage function to send a message to a window procedure for processing.

To remove posted messages in its message queue, an application includes a message loop. A simple message loop may include one function call to each of the following functions: GetMessage, TranslateMessage, and DispatchMessage. The GetMessage function retrieves a message from the queue and copies it into a message data structure. If the application specifies a window handle, then the GetMessage function retrieves only messages intended for the specified window. The TranslateMessage function translates a virtual message from the keyboard into a character specific message and places this message back in the queue. The DispatchMessage sends a message to the window procedure associated with the window handle in the message data structure. An application's message loop can include these functions and a variety of others depending on the desired functionality that the application developer wishes to implement.

In contrast to queued messages, non-queued messages are sent directly to the destination window procedure. The operating system sends non-queued messages to notify a window of events that effect it. For example, when an application activates a new window, the system sends the window procedure a series of messages indicating that the window has been activated, that keyboard input is being directed to the window, and that the cursor has been moved into the borders of the window.

Applications 50 define the general behavior and appearance of their windows by creating window classes and corresponding window procedures. A window class is a set of attributes that the operating system uses to create a window for an application. The window class identifies default characteristics, such as whether the window processes doubleclicks of the mouse buttons or has a menu. Each window class has an associated window procedure shared by all windows of the same class. The window procedure processes messages for all windows of a class, and therefore, controls the behavior and appearance of windows in the class. The window procedure contains the code that defines the behavior of the window, carries out requested tasks, and processes user input. For a more detailed discussion of Window Classes, see "Chapter 3, Window Classes," (Appendix B) included in the file wrapper but not printed herein. For a more detailed discussion of Window Procedures, see "Chapter 4, Window Procedures," (Appendix C) included in the file wrapper but not printed herein.

A window typically includes a number of controls to carry out input and output tasks. Controls are often used inside dialog boxes to provide the user with a means to enter text, choose options, and direct the dialog box to complete its action. Controls in other types of windows provide a variety of services such as letting the user choose commands, view status, and edit text. For a more information about controls, see "Chapter 9, Controls," (Appendix D) included in the file wrapper but not printed herein. For a more detailed disclusion of a button control, see "Chapter 10, Buttons," (Appendix E) included in the file wrapper but not printed herein.

A control is a child window of another window. For example, a control in a dialog box can be a child window of the dialog box. When an application creates a control, the control is a child window of the window identified by the application. The child-parent relationship is significant because a child window sends notification messages to its parent when an event, such as input from a user, occurs in the control. The application relies on these notification messages to determine how it should respond to a user's input.

Like the windows described above, a control belongs to a window class, which can be pre-defined in the operating system, or application-defined. The window class and its corresponding window procedure define the properties of the control, its behavior, appearance and purpose.

The Windows 95 operating system provides support for a number of pre-defined controls in the user module 54. These controls include, for example, buttons, list boxes, edit controls, comboboxes, scroll bars, and static controls. Button controls notify the parent window when the user clicks on a button. List boxes display a list from which the user can select one or more items. Edit controls allow the user to view and edit text. Comboboxes are combinations of edit controls and list boxes, and allow the user to choose and edit items in a list. Scroll bars allow the user to choose the direction and distance to scroll information in a related window. Static controls typically act as labels for other controls. In addition to these standard controls, applications 50 can create custom controls.

Window classes, including pre-defined controls, can have a corresponding set of notification and control messages. Applications 50 rely on notification messages to determine when the user has provided input to the controls. For example, a button sends a notification message to its parent when a user selects the button. Applications 50 use control messages to retrieve information from a control and to manipulate the behavior and appearance of the control. For instance, an application can send a message to a check box to determine whether it currently contains a check mark.

Another type of window supported in a windowing environment is a dialog box. A dialog box is a temporary window an application creates to retrieve user input. A dialog box ordinarily contains one or more controls with which the user enters text, chooses options, or directs the action of a command.

The user module 54 provides a number of functions, messages and pre-defined controls to help create and manage dialog boxes. The Windows 95 operating system provides two types of dialog boxes: modal and modeless. A modal dialog box requires the user to supply information or cancel the dialog box before allowing the application to continue. A modeless dialog box allows the user to supply information and return to the previous task without closing the dialog box. Modal dialog box are generally simpler to manage than modeless dialog boxes because they are created, perform their task, and are destroyed by calling a single function.

To create either a modal or modeless dialog box, an application specifies a dialog box template to describe the dialog box style and content, and a dialog box procedure to carry out tasks. The dialog box template is a binary description of the dialog box and the controls it contains. The application developer can create a template as a resource to be loaded from an application's executable file, or created in memory while the application runs. The dialog box procedure is a callback function that the user module 54 calls when it has input for the dialog box or tasks for the dialog box to carry out.

Dialog boxes can belong to a pre-defined window class. In supporting an application's creation and manipulation of a dialog box, the user module 54 uses this window class and corresponding window procedure for both modal and modeless dialog boxes. When this window procedure is called, it creates the window for the dialog box as well as the windows for all controls in the dialog box, and then sends selected messages to the dialog procedure. While the dialog box is visible on the screen, the pre-defined window procedure manages all messages, processing some and passing others to the dialog procedure so that the dialog procedure can carry out tasks. In this implementation, applications 50 do not have direct access to the pre-defined window class and associated procedure for dialog boxes. Applications 50 use a dialog box procedure and template to control the appearance and behavior of the dialog box. For more information on dialog boxes, see "Chapter 18, Dialog Boxes," (Appendix F) included in the file wrapper but not printed herein.

The common dialog boxes library 52 is a dynamic linked library used to simplify the creation and management of dialog boxes. The common dialog box library 52 provides pre-defined dialog boxes that applications 50 can use to prompt the user for information needed to complete commands, such as the Open, Save, and Print commands in the File Menu.

For each type of common dialog box, the common dialog box library 52 provides a default dialog box procedure and a default template. The default dialog box procedure is a callback function in the common dialog box library 52 that the user module 54 calls when it has input for the dialog box or tasks for the dialog box to carry out. The default template is a binary description of the dialog box and the default controls it contains.

To display a common dialog box, an application makes a single function call to the common dialog box library 52. For example, to display the open file dialog box in this implementation, an application calls a function named "GetOpenFileName" and passes a pointer to a data structure named "OPENFILENAME." A description of the GetOpenFileName function is provided in Table 1 below.

TABLE 1

```
GetOpenFileName
BOOL GetOpenFileName(lpofn)
LPOPENFILENAME lpofnf;   // address of structure with
                            initialization data
            The GetOpenFileName function creates a
            system-defined dialog box that enables the user
            to select a file to open.
Parameters  lpofn
            Points to an OPENFILENAME structure that
            contains information used to initialize the
            dialog box. When GetOpenFileName returns, this
            structure contains information about the user's
            file selection. The OPENFILENAME structure has
            the following form:
            typedef struct tagOFN { // ofn
                    DWORD           lStructSize;
```

TABLE 1-continued

```
            HWND              hwndOwner;
            HINSTANCE         hInstance;
            LPCTSTR           lpstrFilter;
            LPTSTR            lpstrCustomFilter;
            DWORD             nMaxCustFilter;
            DWORD             nFilterIndex;
            LPTSTR            lpstrFile;
            DWORD             nMaxFile;
            LPTSTR            lpstrFileTitle;
            DWORD             nMaxFileTitle;
            LPCTSTR           lpstrInitialDir;
            LPCTSTR           lpstrTitle;
            DWORD             Flags;
            WORD              nFileOffset;
            WORD              nFileExtension;
            LPCTSTR           lpstrDefExt;
            DWORD             lCustData;
            LPOFNHOOKPROC     lfnHook;
            LPCTSTR           lpTemplateName;
      } OPENFILENAME;
```

Return Value  If the user selects a file to open, the
return value is TRUE. It is FALSE if an
error occurs, the user chooses the Cancel
button, the user chooses the Close command
on the System menu to close the dialog
box, or the buffer identified by the
lpstrFile member of the OPENFILENAME
structure is too small to contain the
string that specifies the selected file.
The CommDlgExtendedError function can
be used to get extended error
information, which may be one of the
following values:

| | |
|---|---|
| CDERR_FINDRESFAILURE | CDERR_NOHINSTANCE |
| CDERR_INITIALIZATION | CDERR_NOHOOK |
| CDERR_LOCKRESFAILURE | CDERR_NOTEMPLATE |
| CDERR_LOADRESFAILURE | CDERR_STRUCTSIZE |
| CDERR_LOADSTRFAILURE | FNERR_BUFFERTOOSMALL |
| CDERR_MEMALLOCFAILURE | FNERR_INVALIDFILENAME |
| CDERR_MEMLOCKFAILURE | FNERR_SUBCLASSFAILURE |

COMMENTS  If the hook function (pointed to by the
lfnHook member of the OPENFILENAME
structure) processes the
WM_CTLCOLORBTN, WM_CTLCOLORDLG,
WM_CTLCOLORLISTBOX,
WM_CTLCOLORMSGBOX,
WM_CTLCOLORSCROLLBAR,
or WM_CTLCOLORSTATIC message, the hook
function must return a handle of the brush
that should be used to paint the control
background. Ending the dialog box from
within the hook function by calling the
EndDialog function prevents the common
dialog box library from properly exiting
its worker thread. For applications that
dynamically load and/or unload common
dialog box library, this type of exiting
may result in an access violation during
unloading as the worker thread's address
space is invalidated.

A description of the OPENFILENAME structure is provided in Table 2 below.

TABLE 2

```
OPENFILENAME
typedef struct tagOFN { // ofn
      DWORD             lStructSize;
      HWND              hwndOwner;
      HINSTANCE         hInstance;
      LPCTSTR           lpstrFilter;
      LPTSTER           lpstrCustomFilter;
      DWORD             nMaxCustFilter;
      DWORD             nFilterIndex;
      LPTSTR            lpstrFileTitle;
      DWORD             nMaxFileTitle;
```

TABLE 2-continued

```
      LPCTSTR           lpstrInitialDir;
      LPCTSTR           lpstrTitle;
      DWORD             Flags;
      WORD              nFileOffset;
      WORD              nFileExtension;
      LPCTSTR           lpstrDefExt;
      DWORD             lCustData;
      LPOFNHOOKPROC     lfnHook;
      LPCTSTR           lpstrTemplateName;
} OPENFILENAME;
```

The OPENFILENAME structure contains information
the operating system uses to initialize the
system-defined Open or Save As dialog box.
After the user closes the dialog box, the
system returns information about the user's
selection in this structure.

Members
 lStructSize
  Specifies the length, in bytes, of the
  structure.
 hwndOwner
  Identifies the window that owns the dialog
  box. This member can be any valid window
  handle, or it can be NULL if the dialog
  box has no owner.
 hInstance
  Identifies a data block that contains a
  dialog box template specified by the
  lpstrTemplateName member. This member is
  used only if the Flags member specifies
  the OFN_ENABLETEMPLATE flag; otherwise,
  this member is ignored.
 lpstrFilter
  Points to a buffer containing pairs of
  null-terminated filter strings. The first
  string in each pair describes a filter
  (for example, "Text Files"), and the
  second specifies the filter pattern (for
  example, "*.TXT"). Multiple filters can
  be specified for a single item by
  separating the filter pattern strings with
  a semicolon (for example,
  "*.TXT;*.DOC;*.BAK"). The last string in
  the buffer must be terminated by two NULL
  characters. If this parameter is NULL,
  the dialog box will not display any
  filters. The filter strings are assumed
  to be in the proper order-the operating
  system does not change the order.
 lpstrCustomFilter
  Points to a buffer containing a pair of
  user-defined filter strings. The first
  string describes the filter, and the
  second specifies the filter patter (for
  example "WinWord, *.docnn"). The buffer
  is terminated by two NULL characters. The
  operating system copies the strings to the
  buffer when the user closes the dialog
  box. The system uses the strings to
  initialize the user-defined file filter
  the next time the dialog box is created.
  If this parameter is NULL, the dialog box
  lists but does not save user-defined
  filter strings.
 nMaxCustFilter
  Specifies the size, in characters, of the
  buffer identified by lpstrCustomFilter.
  This buffer should be at least 40
  characters long. This member is ignored
  if lpstrCustomFilter is NULL or points to
  a NULL string.
 nFilterIndex
  Specifies an index into the buffer pointed
  to by lpstrFilter. The system uses the
  index value to obtain a pair of strings to
  use as the initial filter description and
  filter pattern for the dialog box. The
  first pair of strings has an index value
  of 1. When the user closes the dialog TABLE 2-continued

|  |  |
|---|---|
| | box, the system copies the index of the selected filter strings into this location. If nFilterIndex is zero, the custom filter is used. If nFilterIndex is zero and lpstrCustomFilter ius NULL, the system uses the first filter in the buffer identified by lpstrFilter. If all three members are zero or NULL, the system does not use any filters and does not show any files in the file list control of the dialog box. |
| lpstrFile | Points to a buffer that contains a filename used to initialize the File Name edit control. The first character of this buffer must be NULL if initialization is not necessary. When the GetOpenFileName or GetSaveFileName function returns, this buffer contains the drive designator, path, filename, and extension of the selected file. |
| nMaxFile | Specifies the size, in characters, of the buffer pointed to by lpstrFile. The GetOpenFileName and GetSaveFileName functions return FALSE if the buffer is too small to contain the file information. The buffer should be at least 256 characters long. This member is ignored if lpstrFile is NULL. |
| lpstrFileTitle | Points to a buffer that receives the title of the selected file. For Windows versions 3.0 and 3.1, this buffer receives the filename and extension without path information. The application should use this string to display the file title. if this member is NULL, the function does not copy the file title. |
| nMaxFileTitle | Specifies the maximum length of the string that can be copied into the lpstrFileTitle buffer. This member is ignored if lpstrFileTitle is NULL. |
| lpstrInitialDir | Points to a string that specifies the initial file directory. If this member is NULL, the system uses the current directory as the initial directory. |
| lpstrTitle | Points to a string that specifies the initial file directory. If this member is NULL, the system uses the default title (that is, "Save As" or "Open"). |
| Flags | Specifies the dialog box creation flags. This member may be a combination of the following flags: |

| Flag | Description |
|---|---|
| OFN_ALLOWMULTISELECT | Specifies that the File Name list box allows multiple selections. (If the dialog box is created by using a private template, the definition of the File Name list box must contain the LBS_EXTENDEDSEL value.) |
| OFN_CREATEPROMPT | Specifies that the dialog box function should ask whether the user wants to create a file that does not currently exist. (This flag automatically uses the OFN_PATHMUSTEXIST and OFN_FILEMUSTEXIST flags.) |
| OFN_ENABLEHOOK | Enables the hook function specified in the lpfnHook member. |
| OFN_ENABLETEMPLATE | Causes the operating system to create the dialog box by using the dialog box template identified by hInstance and lpTemplateName. |
| OFN_ENABLETEMPLATEHANDLE | Indicates that hInstance identifies a data block that contains a preloaded dialog box template. The operating system ignores lpTemplateName if this flag is specified. |
| OFN_EXTENSIONDIFFERENT | Specifies that the user type a filename extension that differs from the extension specified by lpstrDefExt. The function does not use this flag if lpstrDefExt is NULL. |
| OFN_FILEMUSTEXIST | Specifies that the user can type only names of existing files in the File Name entry field. If this flag is specified and the user enters an invalid name, the dialog box procedure displays a warning in a message box. If this flag is specified, the OFN_PATHMUSTEXIST flag is also used. |
| OFN_HIDEREADONLY | Hides the Read Only check box. |
| OFN_NOCHANGEDIR | Causes the dialog box to set the current directory back to what it was when the dialog box was called. |
| OFN_NOLONGNAMES | Specifies that long filenames are not displayed in the File Name list box. |
| OFN_NONETWORKBUTTON | Hides and disables the Network button. |
| OFN_NOREADONLYRETURN | Specifies that the returned file does not have the Read Only check box checked and is not in a write-protected directory. |
| OFN_NOTESTFILECREATE | Specifies that the file is not created before the dialog box is closed. This flag should be specified if the application saves the file on a create-nonmodify network sharepoint. When an application specifies this flag, the library does not check for write protection, a full disk, an open drive door, or network protection. Applications using this flag must perform file operations carefully, because a file cannot be reopened once it is closed. |
| OFN_NOVALIDATE | Specifies that the common dialog boxes allow invalid characters in the returned filename. Typically, the calling application uses a hook function that checks the filename by using the FILEOKSTRING message. If the text box in the edit control is empty or contains nothing but spaces, the lists of files and directories are updated. If the text box in the edit control contains anything else, nFileOffset and nFileExtension are set to values generated by parsing the text. No default extension is added to the text, nor is text copied to the buffer specified by lpstrFileTitle. If the value specified by nFileOffset is less than zero, the filename is invalid. Otherwise, the filename is |

TABLE 2-continued valid, and nFileExtension and
n/FileOffset can be used as if the
OFN_NOVALIDATE flag had not been
specified.
OFN_OVERWRITEPROMPT
Causes the Save As dialog box to
generate a message box if the
selected file already exists. The
user must confirm whether to
overwrite the file.
OFN_PATHMUSTEXIST
Specifies that the user can type only
valid paths and filenames. If this
flag is used and the user types an
invalid path and filename in the File
Name entry field, the dialog box
function displays a warning in a
message box.
OFN_READONLY
Causes the Read Only check box to be
checked initially when the dialog box
is created. This flag indicates the
state of the Read Only check box when
the dialog box is closed.
OFN_EXPLORER
This flag must be set to get a common
dialog box compatible with the
Windows 95 shell program. The flag
must also be set to get an
application specific extension
specified in a sub-dialog box.
OFN_SHAREAWARE
Specifies that if a call to the
OpenFile function fails because of a
network sharing violation, the error
is ignored and the dialog box returns
the given filename. If this flag is
not specified, the registered message
for SHAREVISTRING is sent to the hook
function with a pointer to a
null-terminated string for the path
and filename in the lParam parameter.
The hook function responds with one
of the following flags:
Flag          Description OFN_SHAREFALLTHROUGH
    Specifies that the filename is
    returned by the dialog box.
OFN_SHARENOWARN
    Specifies no further action.
OFN_SHAREWARN
    Specifies that the user receives
    the standard warning message for
    this error (the same result a if
    there were no hook function).
OFN_SHOWHELP
    Causes the dialog box to show
    the Help button. The hwndOwner
    member must not be NULL if this
    option is specified.
nFileOffset
Specifies a zero-based offset from the
beginning of the path to the filename in
the string pointed to by lpstrFile. For
example, if lpstrFile points to the
following string, "c:÷ir1÷ir2 ile.ext",
this member contains the value 13.
nFileExtension
Specifies a zero-based offset from the
beginning of the path to the filename
extension in the string pointed to by
lpstrFile. For example, if lpstrFile
points to the following string,
"c:÷ir1÷ir2 ile.ext", this member
contains the value 18. If the user did
not type an extension and lpstrDefExt is
NULL, this member specifies an offset to
the terminating null character. If the
user typed "." as the last character in
the filename, this member specifies 0.
lpstrDefExt
Points to a buffer that contains the
default extension. GetOpenFileName and
GetSaveFileName appended this extension to
the filename if the user fails to type an
extension. This string can be any length,
but only the first three characters are
appended. The string should not contain a
period (.). If this member is NULL and
the user fails to type an extension, no
extension is appended.
lCustData
Specifies application-defined data that
the operating system passes to the hook
function identified by lpfnHook. The
system passes the data in the lParam
parameter of the WM_INITDIALOG message.
lpfnHook
Points to a hook function that processes
messages intended for the dialog box. An
application must specify the
OFN_ENABLEHOOK flag in the Flags member to
enable the function; otherwise, the
operating system ignores this structure
member. The hook function should return
FALSE to pass a message to the standard
dialog box procedure or TRUE to discard
the message.
lpstrTemplateName
Points to a null-terminated string that
names the dialog box template to be
substituted for the standard dialog box
template. An application can use the
MAKEINTRESOURCE macro for numbered dialog
box resources. This member is only used
if Flags specifies the OFN_ENABLETEMPLATE
flag; otherwise, this member is ignored.

For additional information on the common dialog box library, see "Chapter 68, Common Dialog Box Library," (Appendix G) included in the file wrapper but not printed herein.

To extend a common dialog box from the common dialog box library 52, the application developer creates a sub-dialog box to the common dialog box. In creating this sub-dialog box, the application developer creates a template and a sub-dialog box procedure. The template for the sub-dialog includes the data necessary to describe the appearance of the sub-dialog. The sub-dialog box procedure is a callback function in the application that receives messages intended for the controls in the sub-dialog box.

The following code is an example of a sub-dialog box procedure:

```
BOOL CALLBACK TestDlgProc(HWND hDlg, UINT uMsg, WPARAM
wParam, LPARAM lParam)
{
switch (uMsg)
{
case WM_INITDIALOG:
    {
//   lParam is lpOFN
    OPENFILENAME *lpOFN = (OPENFILENAME *)lParam;
    MYDATA *lpMyData = (MYDATA *)lpOFN→lCustData;
    SetWindowLong(hDlg, DWL_USER, lpOFN→lCustData);
    CheckDlgButton(hDlg, chx5, lpMyData→bChecked);
    break;
    }
case WM_DESTROY:
    {
```

-continued

```
LPMYDATA lpMyData = (LPMYDATA)GetWindowLong(hDlg,
DWL_USER);
    lpMyData→bChecked = IsDlgButtonChecked(hDlg, chx5);
break;
}
default:
    return(FALSE);
}
return(TRUE);
}
```

The arguments to the sub-dialog procedure are as follows:

| hDlg | the window handle |
|---|---|
| uMsg | message |
| wParam, lParam | message specific parameters |

This sub-dialog procedure processes messages for an application-specific check box identified with the value "chx5". When the dialog box is initialized, it receives the message WM_INITDIALOG along with a pointer (lparam). "lParam" is a pointer to an OPENFILENAME structure used to initialize the dialog box. The SetWindowLong function saves a pointer to application-specific information from the lCustData field of the OPENFILENAME structure. The CheckDlgButton function places a check mark next to or removes a check mark from the button control.

When the dialog box is closed, the sub-dialog box procedure receives the WM_DESTROY message. The GetWindowLong function retrieves information about the sub-dialog box, and the IsDialogButtonChecked function determines whether or not the button control has a check mark next to it. Before removing the dialog box from the system memory, the system stores the state of the button.

The following code is an example of a sub-dialog box template corresponding to the sub-dialog box procedure. This sub-dialog box template will add a checkbox control named "A Checkbox" below the common controls in the common dialog box.

```
IDD_APP32 DIALOG DISCARDABLE 0, 0, 72, 26
STYLE DS_3DLOOK | WS_CHILD | WS_VISIBLE |
WS_CLIPSIBLINGS | DS_CONTROL
FORT 8, "MS Sans Serif"
BEGIN
        CHECKBOX    "A Checkbox",chx5,6,6,60,14
END
```

The following example illustrates the method for extending a common dialog box using a sub-dialog. This example refers to the common dialog box for opening files described above. It should be understood that the same method for extending a dialog box applies to other common dialog boxes and even other types of windows.

The application developer specifies the appearance of a sub-dialog by creating a template specifying the appearance and content of the sub-dialog. This template need only include application-specific extensions to the common dialog box template. These extensions can include a combination of items to be added to the common dialog box. To describe these additional items, the application developer specifies style values that define the appearance and features of the sub-dialog box. The styles can include one or more window style values, dialog box style values, or control style values. For examples of window styles see Chapter 1 at 164–168, (Appendix H) included in the file wrapper but not printed herein; for examples of control style values for button controls see Appendix E at 3–4; and for examples of dialog styles see, Appendix F at 5.

The sub-dialog is a child window of its parent window, the common dialog box. While designing the extensions to the common dialog, the application developer must set the WS_CHILD style in the sub-dialog template. WS_CHILD is a window style indicating that the sub-dialog is to behave as a child window of the common dialog box. As a child window, the sub-dialog box is confined to the area of its parent window, the common dialog box.

The sub-dialog's status as a child of the common dialog box affects how messages are passed to the sub-dialog box procedure. After the common dialog and sub-dialog boxes are created, the user module 54 passes input messages directly to the child window when an input event occurs within the child window. Controls within the sub-dialog, for example, are child windows of the sub-dialog. If the user selects a control such as a button located in the sub-dialog, the user module 54 sends a message to the immediate parent of the control, which in this case is the sub-dialog box.

In addition to creating the sub-dialog template, the application developer provides a sub-dialog procedure to process messages intended for the sub-dialog. This sub-dialog procedure is a dialog box procedure provided by the application. When the sub-dialog is created, the sub-dialog procedure receives a handle to the sub-dialog. The sub-dialog procedure thereafter receives messages sent to the sub-dialog.

Figure 3:
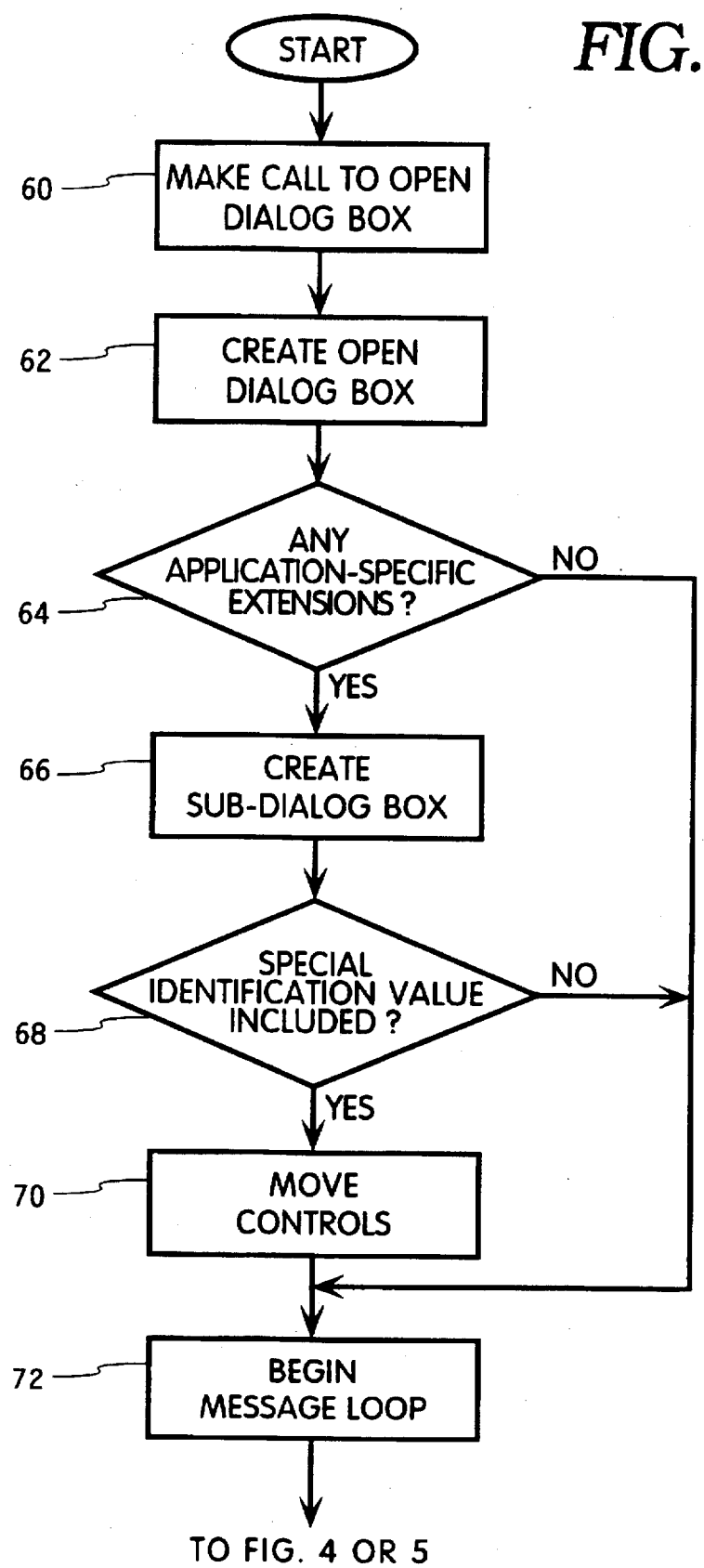
FIG. 3 illustrates the operation of a common dialog box according to an embodiment of the invention.

FIG. 3 illustrates an example of the operation of a common dialog box. When an application wants to use the customized dialog box, it calls GetOpenFileName in the common dialog box library 52 (see step 60). In the process of making this function call, the application passes the name of the sub-dialog template and the sub-dialog procedure to the common dialog box library 52.

The application passes the OpenFileName structure to the common dialog box library 52. The OpenFileName includes a number of fields and flags specifying that the application is extending the common dialog box. The application sets the OFN_EXPLORER flag in the .flags field of the OpenFileName structure, and the .hinstance, .lpfnHook, and .lpTemplateName fields are interpreted as follows:

When the OFN_ENABLETEMPLATE flag is set in the .flags field, the .lpTemplateName field is the name of the dialog template and the .hInstance field is the module instance. "lpTemplateName" may be either a pointer to a string specifying a named dialog template resource, or it may be an integer less than 64 K specifying a numbered dialog template resource. In either case, hInstance is the handle for the executable code (currently loaded into memory) that contains the resource (this could be the application's executable file, or some DLL that it loads).

When the OFN_ENABLETEMPLATEHANDLE flag is set in the .flags field, the .hInstance field should contain the memory handle for the dialog box template.

When the OFN_ENABLEHOOK flag is set in the .flags field, the .lpfnHook field is a DLGPROC (not an LPOFNHOOKPROC) that is associated with the sub-dialog box.

In response to the GetOpenFileName call, the common dialog box library 52 calls the user module 54 to create the customized open file dialog box (see step 62). Specifically, the common dialog box library 52 calls the DialogBoxParam function to create the common dialog box. The user module 54 creates the common dialog box using the default template and default common dialog box procedure passed to it from the common dialog box library 52.

If the OpenFileName structure indicates that application-specific extensions exist, the common dialog box library 52 calls the CreateDialogIndirectParam function to create the sub-dialog box (see steps 64 and 66). The user module 54 creates the sub-dialog using the sub-dialog template and sub-dialog procedure originally specified by the application in the OpenFileName structure. The common dialog box library calls the CreateDialogIndirectParam in the user module to load the sub-dialog and fill it with controls.

The sub-dialog box is created as a child window of the common dialog box. The dialog box is resized to fit both the application-specific controls and the common dialog box controls. The default location for new controls specified in the application-defined template is below the common dialog box controls.

While creating the sub-dialog box, the common dialog box library calls the GetDlgItem function to determine whether the sub-dialog box template includes a control with a special identification value, stc32 (see step 68). If this control is not in the sub-dialog template, then the common dialog places the application-specific controls below the common controls as a default. The definition of each control includes its horizontal and vertical coordinates (for simplicity, x and y coordinates) relative to the upper left corner of the dialog box. To place the application-specific controls in the default position below the common controls, the common dialog box library calls the SetWindowPos function in the user module and changes the y coordinate to accommodate the size of the common dialog box.

If the stc32 control is in the sub-dialog box, the common dialog box library determines the size of the stc32 control, and then moves controls as necessary relative to the stc32 control (see step 70). When creating a sub-dialog template, the application developer can add an stc32 control to specify the rectangular area of the screen display where the common controls should reside. Then, the developer can position application-specific controls relative to coordinates of the stc32 control. As the sub-dialog box is created, the common dialog box library finds the stc32 control and calls GetWindowRect to get its dimensions. The GetWindowRect function fills a structure with the screen coordinates of the upper left and lower right corners of the window. If the stc32 control is too small to include the common dialog box controls, then the application-specific controls need to be moved to accommodate the relative position of application-specific controls to the stc32 control. The common controls will be moved if the stc32 control is at a position other than the upper left corner of the dialog box.

For example, if the width of the stc32 control is smaller than the width of the common dialog box, then application specific controls positioned to the right of the stc32 control are moved further to the right by the amount of the difference in widths. Similarly, if the height of the stc32 control is less than the height of the common dialog box, then application specific controls are moved further down. Controls are moved by adding the difference to either their x or y coordinates. As a result, the developer can position application specific controls relative to the stc32 control, and if the stc32 is not big enough, the common dialog will move controls accordingly.

In cases where the application developer wants to place controls to the left or above the common controls, the developer can use a stc32 control and position application-specific controls to the left or above the stc32 control's coordinates. The common dialog then can move the common controls to make room for the application-specific controls.

To process messages for the common dialog box, the user module 54 temporarily takes over the message queue for the application. The user module 54 then starts its own message loop to retrieve and dispatch messages to the appropriate window procedure (see step 72). When a user input generates a message for a child window, then the user module 54 sends a message to the window procedure associated with the child window. The child window then notifies its parent window by sending a notification message to the parent window procedure.

Figure 4:
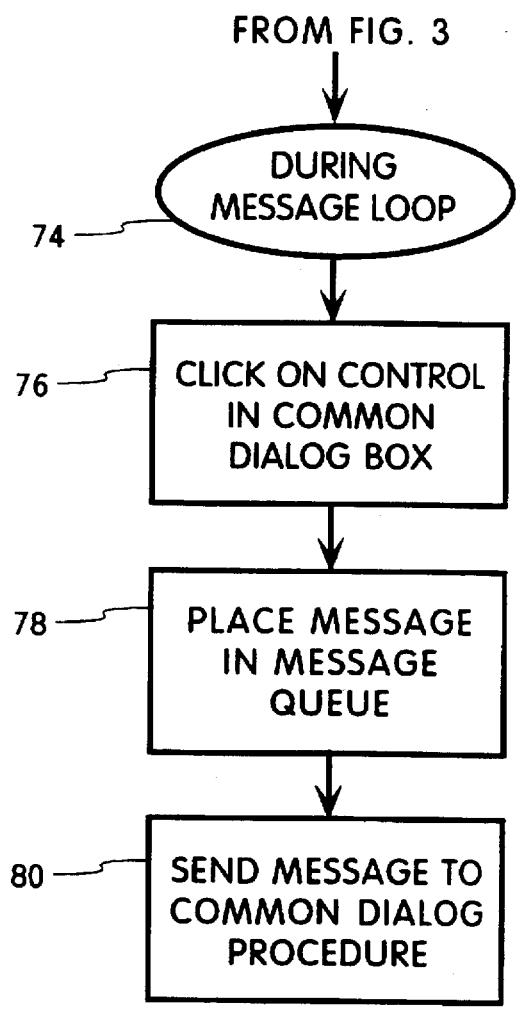
FIG. 4 illustrates how input messages to the common controls in a common dialog box are processed in an embodiment of the invention.
Figure 5:
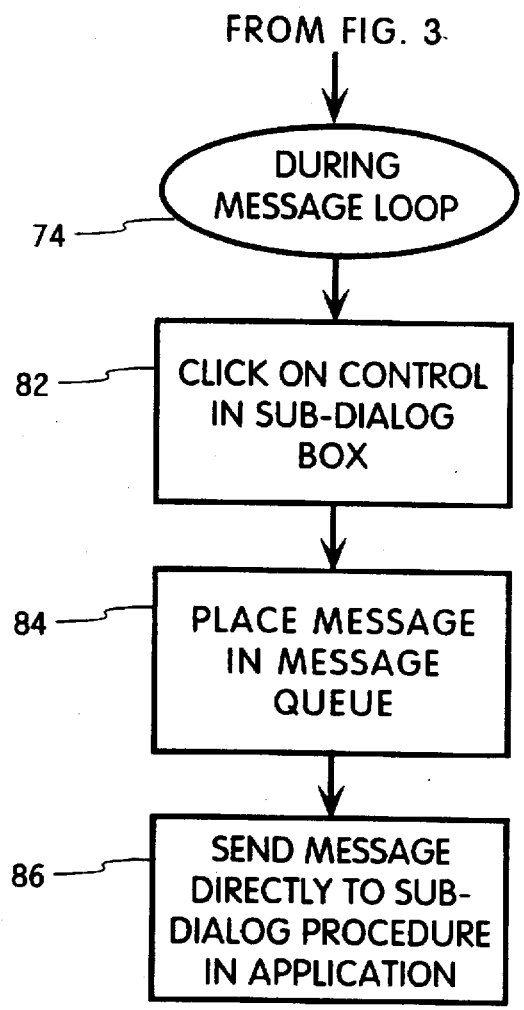
FIG. 5 illustrates how input messages to the application-specific controls are processed in an embodiment of the invention.

FIGS. 4 and 5 illustrate how messages corresponding to user input to the dialog box are transferred to the common and sub-dialog box procedures, respectively. During the message loop, the user module gets messages corresponding to user input such as a click on a button and dispatches those input messages to the dialog box (see step 74). When a user input generates a message for a control in the common dialog (see step 76), the base operating system places an input message in the applications message queue (see step 78). The user module 54 then sends it to the window procedure associated with this control. As a child window of the common dialog box, the control notifies the common dialog box by sending a notification message to the common dialog box procedure (see step 80).

When a user input generates a message for a control in the sub-dialog box, the base operating system places an input message in the applications message queue (see step 84). The user module 54 then gets this message and sends it to the window procedure associated with this control. As a child window of the sub-dialog box, the control notifies the sub-dialog box of the user input by sending a notification message directly to the sub-dialog box procedure (see step 86).

By placing application-specific extensions in a sub-dialog box procedure, this method of extending a common dialog box separates message processing between the application-specific sub-dialog box, and the common dialog box. Messages intended for the sub-dialog do not need to be passed through the common dialog procedure, but rather, can be passed directly to the sub-dialog box procedure. Conversely, the application does not need to hook messages intended for the common dialog box procedure. Messages relating to the common dialog box procedure are sent directly to the common dialog box procedure. An application can request information about user input to the common dialog box, but the common dialog box procedure does not automatically forward all messages to the application.

FIG. 6 illustrates the relationship between parent and child windows in a common dialog box. The common dialog box 90 is a window including both common dialog box controls 92 and application-defined controls 94 in a sub-dialog box. The common dialog box controls 92 are the standard controls in the open file common dialog box supported in the common dialog box library 52. The sub-dialog box controls 94 are the controls defined in the sub-dialog box template provided by the application. When a user clicks on a button 96 among the sub-dialog box controls, the user module 54 sends a notification message directly to the sub-dialog box procedure in the application 50. Similarly, when a user clicks on a button 98 among the standard controls, the user module 54 sends a notification message directly to the common dialog box procedure in the common dialog box library 52. In both cases, the user module sends the notification message to the immediate parent of the button.

Though we have described a specific embodiment of the invention, it should be understood that this method of extending a common dialog box can be used in a variety of applications in a windowing environment. For example, the method for extending a common dialog box described above can be applied to other types of common windows provided by an operating system as a shared resource for applications. The invention, therefore, is not limited to a common dialog box, but rather, extends to other types of windows. Moreover, the invention is not limited to the system architecture depicted in FIG. 2. It is preferable to implement support for common windows in a dynamic link library such as the common dialog box library, but the specific relationship among this library, the user module, and the base operating system is not critical to the invention.

In view of the many possible embodiments to which the principles of our invention may be put, it is emphasized that the detailed embodiments described herein are illustrative only and should not be taken as limiting the scope of our invention. Rather, I claim as my invention all such embodiments as may come within the scope and spirit of the following claims and equivalents thereto.

APPENDICES

Forming a part of the present specification are the following appendices, from the Software Developer's Kit (SDK) for the Windows 95 operating system, included in the file wrapper, but not printed herein.

| Appendix A | Chapter 2: "Messages and Message queues" |
|---|---|
| Appendix B | Chapter 3: "Window Classes" |
| Appendix C | Chapter 4: "Window Procedures" |
| Appendix D | Chapter 9: "Controls" |
| Appendix E | Chapter 10: "Buttons" |
| Appendix F | Chapter 18: "Dialog Boxes" |
| Appendix G | Chapter 68: "Common Dialog Box Library" |
| Appendix H | Chapter 1: "Windows" |

(Copyright in the appendices is maintained by Microsoft Corporation).

We claim:

1. A method for extending a common dialog box in a windowing environment of a programmed computer system, the method comprising:

in response to a request from an application to create a common dialog box, creating a common dialog box using a common dialog box template provided in a common dialog box library, reading a sub-dialog box template provided by the application;

adding application-specific features defined in the sub-dialog box template to the common dialog box by creating a sub-dialog box;

displaying a combined common dialog box and the sub-dialog box on a display screen of the programmed computer system;

in response to user input to the sub-dialog box, sending a first notification message to a sub-dialog box procedure in the application to process the user input to the sub-dialog box; and in response to user input to the common dialog box, sending a second notification message to a common dialog box procedure in the common dialog box library to process the user input to the common dialog box.

2. The method of claim 1 wherein the common dialog box template is binary data defining the appearance and controls included in the common dialog box and the sub-dialog box template is binary data defining application-specific controls to be added to the common dialog box.

3. The method of claim 2 wherein the adding step includes resizing the common dialog box to include the application-specific controls defined in the sub-dialog box template to be added to the common dialog box.

4. The method of claim 1 wherein the request from the application is a function call specifying the sub-dialog box template and sub-dialog procedure associated with the sub-dialog box.

5. A method for extending a common dialog box in a windowing environment of a programmed computer system, the method comprising:

receiving a function call from an application to create a common dialog box in a shared common dialog box library, the function call specifying a sub-dialog box template and a sub-dialog box procedure;

creating a common dialog box in response to the function call;

creating a sub-dialog box to the common dialog box in response to the function call using the sub-dialog box template to add application-specific controls to the common dialog box;

displaying the common dialog box and the sub-dialog box on a display screen of the computer system;

in response to user input at an application-specific control in the sub-dialog box, reporting the user input directly to the sub-dialog box procedure; and in response to user input at a standard control in the common dialog box, reporting the user input directly to the common dialog box procedure in the shared common dialog box library.

6. The method of claim 5 wherein the shared common dialog box library is a dynamic link library accessible to a plurality of applications running in the computer system.

7. The method of claim 5 further including the steps of:

in response to user input at an application-specific control in the sub-dialog box, sending a first message to a control procedure associated with the application-specific control in the sub-dialog box, and sending a second message to the sub-dialog procedure in the application.

8. The method of claim 5 further including the steps of:

in response to user input at a standard control in the common dialog box, sending a first message to a control procedure associated with the standard control in the common dialog box, and sending a second message to the common dialog procedure in the shared common dialog box library.

9. A method for extending a common user interface window in a windowing environment of a programmed computer system, the method comprising:

receiving a command from an application to create a common window on a display screen, the command specifying an application-specific template that defines the appearance of an application-specific extension to the common window and specifying a child window procedure that processes input directed to the application-specific extension;

in response to the command, creating a common window including a parent common window and a child window of the parent common window, the child window including the application-specific extension to the common window;

displaying the common window including the application-specific extension on a display screen; and processing user input to the application-specific extension by sending a message corresponding to the user input directly to the child window procedure.

10. The method of claim 9 wherein the application-specific template defines a child window to the common window, the child window including only the application-specific extension to the common window.

11. The method of claim 9 wherein the creating step includes: positioning the application-specific extension relative to the parent common window so that the common window includes both the application-specific extension and one or more common controls in the parent common window.

12. The method of claim 11 wherein the positioning step includes:

positioning the application-specific extension below the one or more common controls in the parent common window by adjusting a coordinate representing position of the application-specific extension.

13. The method of claim 11 wherein the positioning step includes:

reading coordinates of the application specific extension, wherein the coordinates specify a position of the application-specific extension relative to the one or more common controls;

determining whether the coordinates of the application specific extension need to be adjusted to fit the one or more common controls and the application-specific extension in the common window; and if the coordinates of the application-specific extension need to be adjusted, then adjusting the coordinates of the application-specific extension to maintain the position of the application-specific extension relative to the one or more common controls.

14. The method of claim 11 wherein the positioning step includes:

reading coordinates of the application specific extension, wherein the coordinates specify a position of the application-specific extension relative to the one or more common controls;

determining whether the coordinates of the application specific extension need to be adjusted to fit the one or more common controls and the application-specific extension in the common window; and if the coordinates of the application-specific extension need to be adjusted, then adjusting coordinates of the one or more common controls to maintain the position of the application-specific extension relative to the one or more common controls.

* * * * *

UNITED STATES PATENT AND TRADEMARK OFFICE
CERTIFICATE OF CORRECTION

PATENT NO. : 5,675,520
DATED : October 7, 1997
INVENTOR(S) : Pitt, III, et. al.

It is certified that error appears in the above-indentified patent and that said Letters Patent is hereby corrected as shown below:

Column 3, line 17, "box," should read --box.--.

Column 5, line 36, "message.." should read --message.--.

Column 9, line 17, "1fnHook;" should read --1pfnHook;--.

Column 9, line 37, "1fnHook;" should read --1pfnHook;--.

Column 10, line 9, "1fnHook;" should read --1pfnHook; --

Column 13, line 57, "c:÷ir1÷ir2 ile.ext" should read --c:\dir1\dir2\file.ext--.

Column 13, line 63, "c:÷ir1÷ir2 ile.ext" should read --c:\dir1\dir2\file.ext--.

Column 15, line 43, "IDD APP32" should read --IDD-APP32--.

Column 15, line 46, "FORT" should read --FONT--.

Signed and Sealed this

Twenty-eighth Day of July, 1998

Attest:

BRUCE LEHMAN

Attesting Officer

Commissioner of Patents and Trademarks